United States Patent [19]

Weddigen et al.

[11] Patent Number: 4,639,496

[45] Date of Patent: Jan. 27, 1987

[54] METHOD FOR THE MANUFACTURE OF A POLYMER REACTED WITH FECL$_3$

[75] Inventors: Gerd Weddigen; Robert Huber, both of Heidelberg; Birgit Schmidt, Ludwigshafen; Hartmut Schneider, Plankstadt, all of Fed. Rep. of Germany

[73] Assignee: Brown, Boveri & Cie AG, Mannheim-Käfertal, Fed. Rep. of Germany

[21] Appl. No.: 770,701

[22] Filed: Aug. 29, 1985

Related U.S. Application Data

[62] Division of Ser. No. 563,871, Dec. 21, 1983, Pat. No. 4,564,466.

[30] Foreign Application Priority Data

Dec. 24, 1982 [DE] Fed. Rep. of Germany ....... 3248088

[51] Int. Cl.$^4$ ................................................ C08G 8/28
[52] U.S. Cl. ..................... 525/506; 525/472; 525/480; 525/505; 528/138; 528/153; 528/155; 528/158; 528/165; 528/266
[58] Field of Search ............... 528/138, 165, 153, 155, 528/266; 430/295; 428/601; 525/505, 506, 472, 480

[56] References Cited

U.S. PATENT DOCUMENTS

| | | | |
|---|---|---|---|
| 2,504,100 | 4/1950 | Plank et al. | 528/138 |
| 3,317,473 | 5/1967 | Ploeger et al. | 528/165 X |
| 3,320,213 | 5/1967 | Smith | 528/153 X |
| 3,424,698 | 1/1969 | Lupinski et al. | 430/295 X |
| 3,446,773 | 5/1969 | Schwarz | 528/155 X |
| 3,481,840 | 12/1969 | Lupinski et al. | 428/601 |
| 3,493,526 | 2/1970 | Smith | 528/153 X |
| 4,360,660 | 11/1982 | Watarai et al. | 528/266 |

OTHER PUBLICATIONS

Chem. Abstracts, 98, (1983), 91157u, Dorsch et al.
Chem. Abstracts, 94, (1981), 130361v, Konishiroku.
Chem. Abstracts, 78, (1973), 137679h, Ohseki et al.
Chem. Abstracts, 98, (1983), 63341f, Takeshi et al.
Chem. Abstracts, 93, (1980), 27438f, Weddigen et al.
Chem. Abstracts, 73, (1970), 99480y, Learmonth et al.
Chem. Abstracts, 93, (1980), Kanegafuchi, 133076w.

*Primary Examiner*—Howard E. Schain
*Attorney, Agent, or Firm*—Herbert L. Lerner; Laurence A. Greenberg

[57] ABSTRACT

Method for the manufacture of a polymer with triaromatic methane units as basic building blocks, the electric conductivity of which is obtained through the formation of charge transfer complexes. Electron donors and/or electron acceptors are added to the synthetic polymer during or after its preparation, for forming charge transfer complexes.

1 Claim, No Drawings

METHOD FOR THE MANUFACTURE OF A POLYMER REACTED WITH FECL₃

This is a division of application Ser. No. 563,871, filed Dec. 21, 1983, now U.S. Pat. No. 4,564,466.

BACKGROUND OF THE INVENTION

1. Field of the Invention

The invention relates to a method for manufacturing a polymer with triaromatic methane units as basic building blocks, the electric conductivity of which is obtained through the formation of charge transfer complexes.

2. Description of the Prior Art

Such polymers are suitable for the manufacture of housings and protective coatings of electrical equipment as well as for coatings covering elements for walls and furniture.

In electrotechnology there is a large demand for polymers, the electric conductivity of which can be chosen freely, within a range between $10^{-14}$ and $10^{-7}$ $(\text{ohm cm})^{-1}$, referred to the cross section of the synthetic resin compound, in which the synthetic resin compound still acts as an insulator. This makes it possible to maintain a sufficient insulating effect and at the same time prevent electrostatic charging. These polymers can be used as antistatic surface coatings as well as for insulating between metallic sides with different potentials. In the latter case, the bulk conductivity is large enough to avoid electric breakdowns on the surface, which are caused by conductive contamination.

British Patent 10 67 260 discloses a synthetic polymer which is a nitrogen-containing polymer, in which the electric conductivity is achieved by the formation of charge-transfer complexes.

Furthermore, polymers are known, in which increased electron conductivity is achieved by admixing to its base material electron-conducting fillers such as copper, gold, platinum, carbon or graphite. Synthetic resins with these additives have the disadvantage that the conductivity is not increased if the content of these fillers is small, but that, if the addition is increased, the conductivity is increased suddenly so that it increases beyond the desired value and the insulation property gets lost.

Polymers without additives have an electric bulk conductivity from $10^{-15}$ to $10^{-18}$ $(\text{ohm cm})^{-1}$. For these polymers to be used for the manufacture of housings and coatings of electrical equipment, they should have an electric bulk conductivity which is approximately between $10^{-17}$ and $10^{-14}$ $(\text{ohm cm})^{-1}$.

SUMMARY OF THE INVENTION

It is therefore an object of the invention to provide a method, in which the electric bulk conductivity in a synthetic resin with triaromatic methane units as the basic building blocks can be set to a demand value by the formation of charge transfer complexes.

With the foregoing and other objects in view, there is provided in accordance with the invention a method for the production of a synthetic polymer with triaromatic methane units as basic building blocks having an electric conductivity obtained through the formation of charge transfer complexes, which comprises incorporating in the synthetic polymer a member selected from the group consisting of electron donors and electron acceptors to effect formation of charge transfer complexes.

Other features which are considered as characteristic for the invention are set forth in the appended claims.

Although the invention is illustrated and described herein as embodied in a method for the manufacture of a polymer, it is nevertheless not intended to be limited to the details shown, since various modifications may be made therein without departing from the spirit of the invention and within the scope and range of equivalents of the claims.

The invention, however, together with additional objects and advantages thereof will be best understood from the following.

DETAILED DESCRIPTION OF THE INVENTION

The invention relates to a method for manufacturing a polymer with triaromatic methane units as the basic building blocks, in which the electric conductivity is achieved by the formation of charge transfer complexes. According to the invention, electron acceptors and/or electron donors are admixed to the polymer during its preparation. Suitable electron acceptors are iodine, sulfur trioxide ($SO_3$) and ferric chloride ($FeCl_3$). Sodium is an electron donor.

The formation of charge transfer complexes in a polymer, the basic building blocks of which consist of triaromatic methane units, can be brought about by the addition of electron acceptors prior to or after the preparation of the polymer. Charge transfer complexes are also formed in this polymer if electron donors are added to the starting materials forming the polymer during the preparation. The addition of electron acceptors and electron donors to the base material of the polymer likewise contributes to the formation of charge transfer complexes.

Electron acceptors may, for instance, be substances which can accept electrons from other molecules or atoms particularly easily. Electron donors are substances which can give off electrons to other atoms or molecules particularly easily.

A polymer, the basic building blocks of which are triaromatic methane units, is a neutral substance. If the polymer is considered in small volume units, functional groups with particularly high electron density occur there, and at another point, such groups occur with low electron density. Among the groups with high electron density are carbon double bonds, carbon triple bonds, NH-groups, CN triple bonds, carbon bonds in aromatics and heterocycles as well as CN bonds in heterocycles, OH-groups, SN groups, ether and thioether groups, iodine, nitrogen, single and multiple bonds and, finally, oxygen and sulfur bonds. Among the groups which have a low electron density or an electron deficiency in a polymeric organic compound, are carbon double bonds which have the following electron-detracting groupings adjacent to both, such as halogen groups, pseudo groups, carbonyl groups, nitro groups, OH-groups, SH-groups, CS-groups. In addition there are among them the sulfur in sulfonium salt bonds, the oxygen in oxonium salt bonds and the nitrogen in ammonium salt bonds.

According to the present invention, the bulk conductivity of the polymer with triaromatic methane units is increased by the measure that, in analogy to the formation of charge transfer complexes, the functional groups of the polymer provided with an electron deficiency are reacted with added electron donor molecules. Similarly, it is possible to react the functional groups of the polymers provided with an excess of electrons with electron acceptor molecules. Charge transfer complexes are then produced in the polymer of which complex the donor and/or acceptor component is a respective part of the polymer. Electrons freely mobile in the polymer are created with reference to the number of the charge transfer complexes so integrated. If the concentration of the additive, especially the addition of electron acceptors and/or electron donors is increased, the number of integrated charge transfer complexes is increased if the polymer still has suitable, unreacted functional groups available. Then, the number of the freely mobile electrons is increased and thereby, the bulk conductivity as a function of the concentration of the admixed additive or additives. With an additional of 20% by weight sulfur trioxide ($SO_3$), an electric conductivity of $2 \times 10^{-5}$ (ohm cm)$^{-1}$ can be achieved. With the admixture of iodine which can be as high as 50% by weight, even an electric conductivity of $3 \times 10^{-4}$ (ohm cm)$^{-1}$ can be achieved. The weights mentioned are relative to the total weight of the polymer. Ferric chloride in an amount of 10 to 50% by weight relative to the total weight of the polymer are admixed to the polymer as the electron acceptor.

Sodium acts as an electron donor in the polymer. By an addition of 1 to 60% by weight and preferably, 10% by weight sodium, a conductivity of $5 \times 10^{-14}$ (ohm cm)$^{-1}$ can be achieved. All weight data are relative to the total weight of the polymer.

Prior to the doping with sodium, all OH-groups are preferably reacted with isocyanate which are known compounds containing the isocyanate group, —NCO group attached to an organic radical or hydrogen. Monoisocyanates are preferred compounds and contain only one —NCO group.

The polymer itself can be formed in the polycondensation of at least one aromatic aldehyde and at least one aromatic ring compound which has at least one functional group which increases the electron density in the aromatic ring compound and thereby aids the electrodensity in the aromatic ring compound and thereby aids the electrophilic attack.

The polymer can in particular be formed by polycondensation of bisphenol-A,

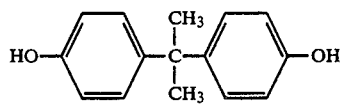

and 4-diamethylaminobenzaldehyde

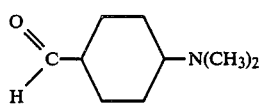

A synthetic polymer with triaromatic methane units as basic building blocks can also be produced by polycondensation of bisphenol-A and para-anisaldehyde

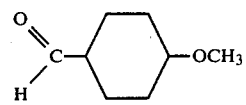

According to the invention, the electron acceptors and/or electron donors which are required for the formation of the charge transfer complexes, are admixed to the above-described base materials after the polycondensation.

According to the invention, the synthetic polymer, in which the electric bulk conductivity is freely selectable within a range from $2 \times 10^{-15}$ to $3 \times 10^{-4}$ (ohm cm)$^{-1}$, can also be formed in the polycondensation of at least one aromatic aldehyde and at least one aromatic ring system such that in the ring system, at least two H-atoms are replaced by at least two functional groups, by which the electron density is increased at least at two points in the ring system.

The polymer can likewise be formed by polycondensation of an aromatic aldehyde and at least one ring system which has 2 OH-groups. Instead of a ring system with 2 OH-groups, an aromatic ring system can also be used which comprises 2 SH-groups. The synthetic polymer can also be produced in a polycondensation of an aromatic aldehyde and an aromatic ring compound which contains 2 amino groups. With the aid of the following example, the manufacture of the synthetic polymer with an electric bulk conductivity of $2 \times 10^{-5}$ (ohm cm)$^{-1}$ is described, where the base material used for the polycondensation consists of benzaldehyde and resorcinol

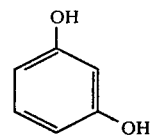

In preparing a small amount of this polymer with the above-described conductivity, 6 g resorcinol (approximately 0.06 mol) and 6 g benzaldehyde (approximately 0.06 mol) are dissolved in 100 ml acetone. The reaction solution is subsequently stirred and is simultaneously cooled by means of ice. In the course of 10 minutes, 0.6 ml concentrated hydrochloric acid, which is dissolved in 5 ml acetone, is fed into the reaction. After a reaction time of 51 minutes, the acetone and the hydrochloric acid are evaporated at 45° C. by means of a rotary evaporator. Remaining monomers are separated by storing the product for 2 hours at 70° C. in a vacuum drying cabinet. The yield of reaction product is somewhat more that 90% relative to the amount of starting material used. The polymer prepared in this manner is soluble in methylformamide, tetrahydrofuran and acetone. Its melting point can be adjusted between 90° and 300° C. The reaction product obtained in this manner is reacted in acetone with 20% by weight $SO_3$ or $H_2SO_4$ at 50° C. within a period of 1 hour. The amount of the acetone used was 10-times the volume of the reaction product. The polymer produced in this manner has an electric conductivity of $1 \times 10^{-5}$ (ohm cm)$^{-1}$.

The foregoing is a description corresponding, in substance, to German application P 32 48 088.1, dated Dec. 24, 1982, international priority of which is being claimed for the instant application, and which is hereby made part of this application. Any material discrepancies between the foregoing specification and the specification of the aforementioned corresponding German application are to be resolved in favor of the latter.

There is claimed:

1. Method for the production of a synthetic polymer with triaromatic methane units as basic building blocks having an electric conductivity through formation of charge transfer complexes, said polymer selected from the group consisting of a polymer formed by polycondensation of bisphenol-A,

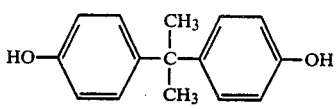

and 4-dimethylaminobenzaldehyde

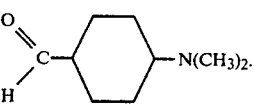

by polycondensation of bisphenol-A and para-anisaldehyde

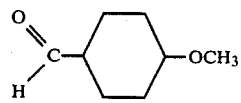

and by polycondensation of benzaldehyde and resorcinol, which comprises adding 10 to 50% by weight ferric chloride relative to the total weight of the polymer as an electron acceptor and reacting the ferric chloride with the polymer to form charge transfer complexes and produce a fusible and soluble polymer with an electric bulk conductivity within a range from $2 \times 10^{-15}$ to $3 \times 10^{-4}$ $(ohm \times cm)^{-1}$.

* * * * *